July 6, 1943.  A. F. MURTY ET AL  2,323,669
TANDEM FRONT END AXLE AND STEERING ASSEMBLY
Filed Dec. 31, 1941  4 Sheets-Sheet 1
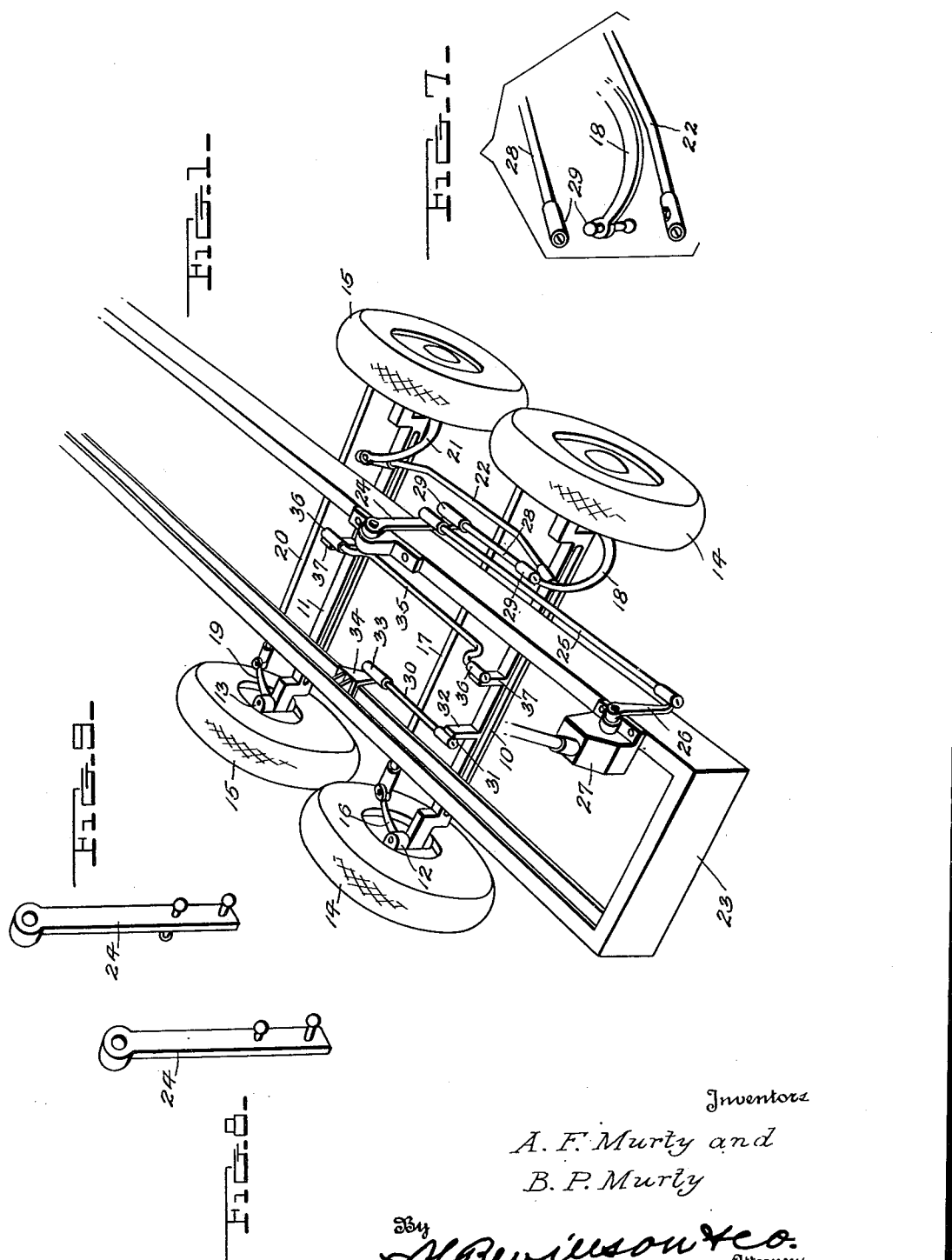
Inventors
A. F. Murty and
B. P. Murty
By H. B. Wilson & Co.
Attorneys

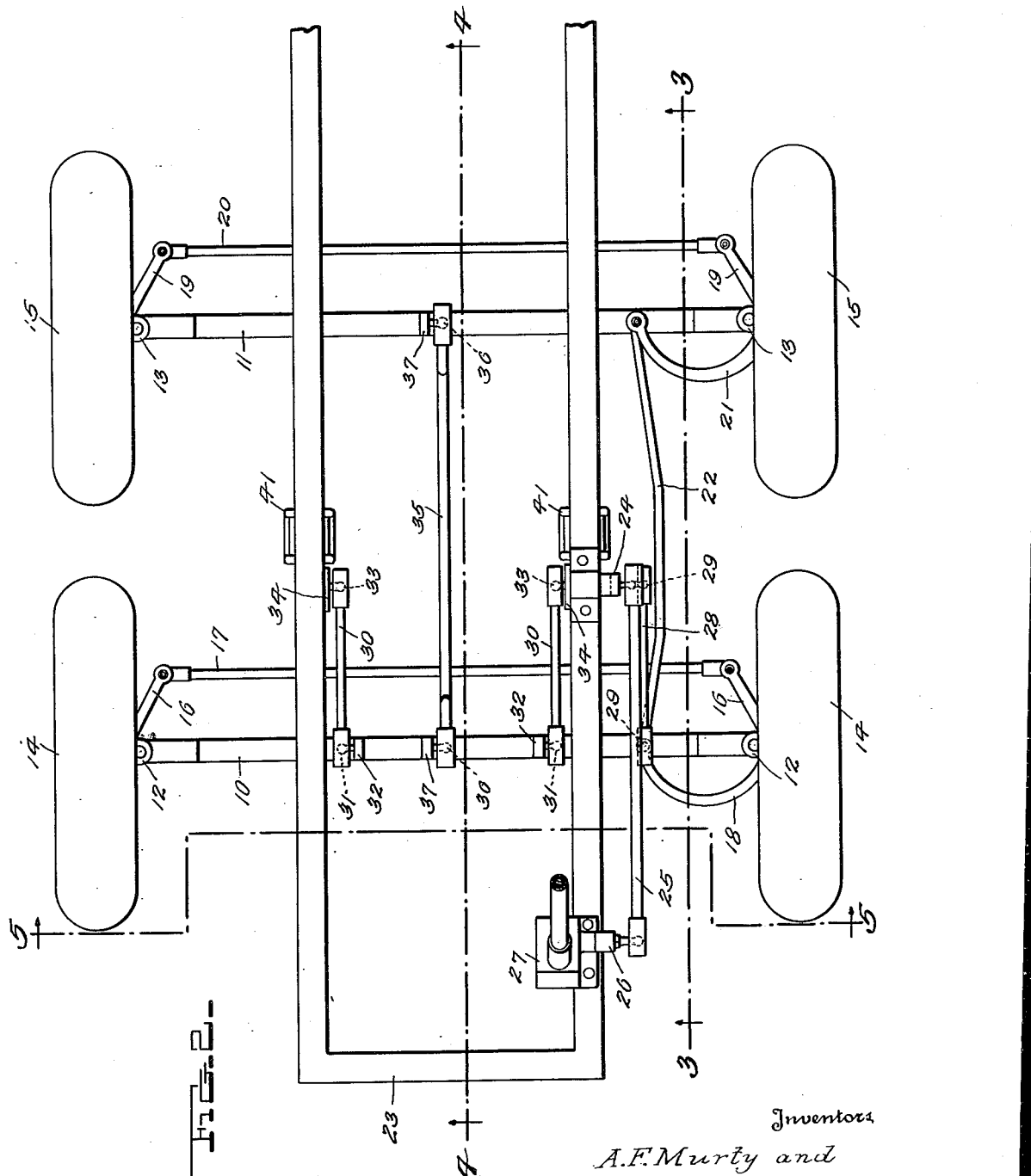

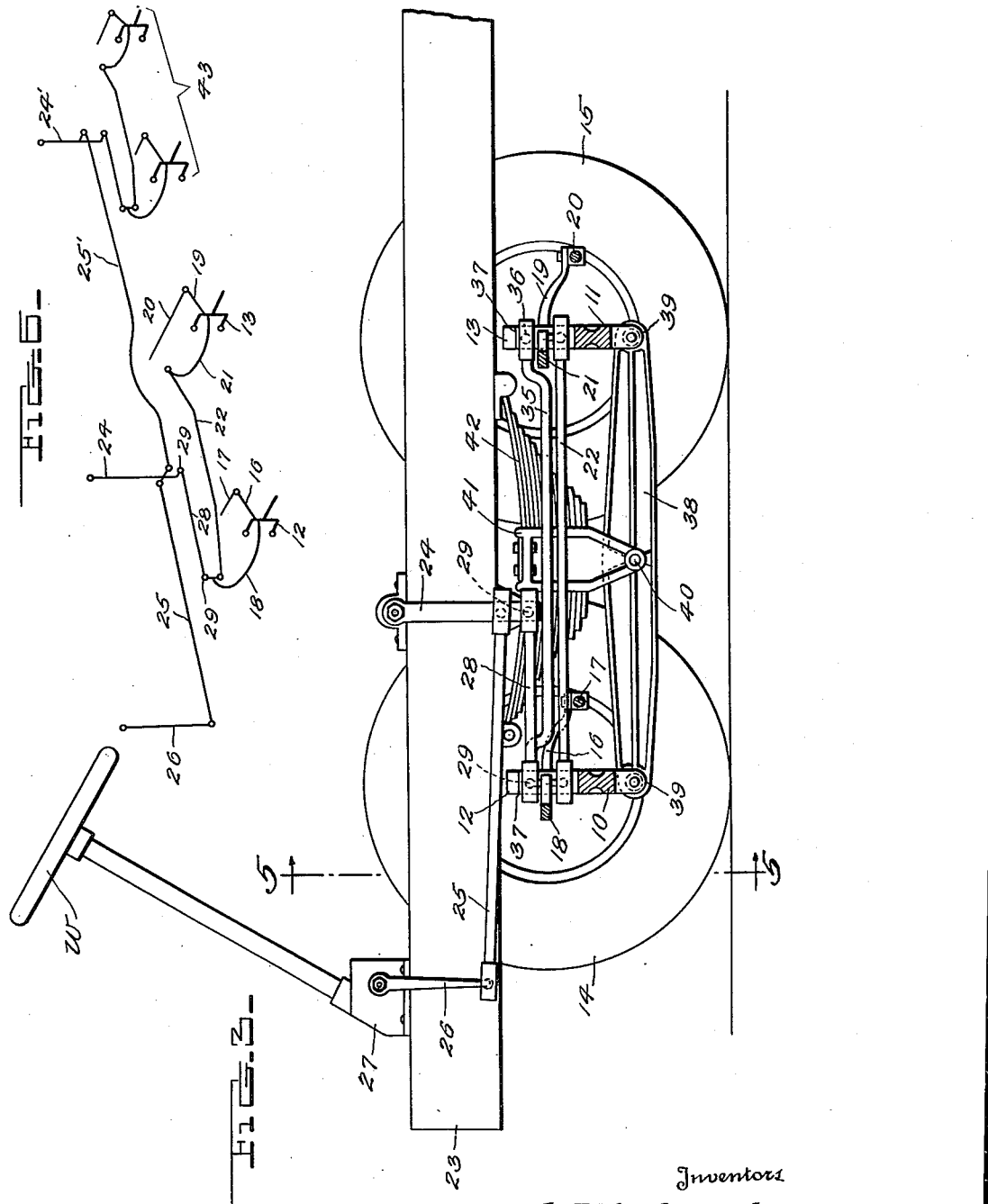

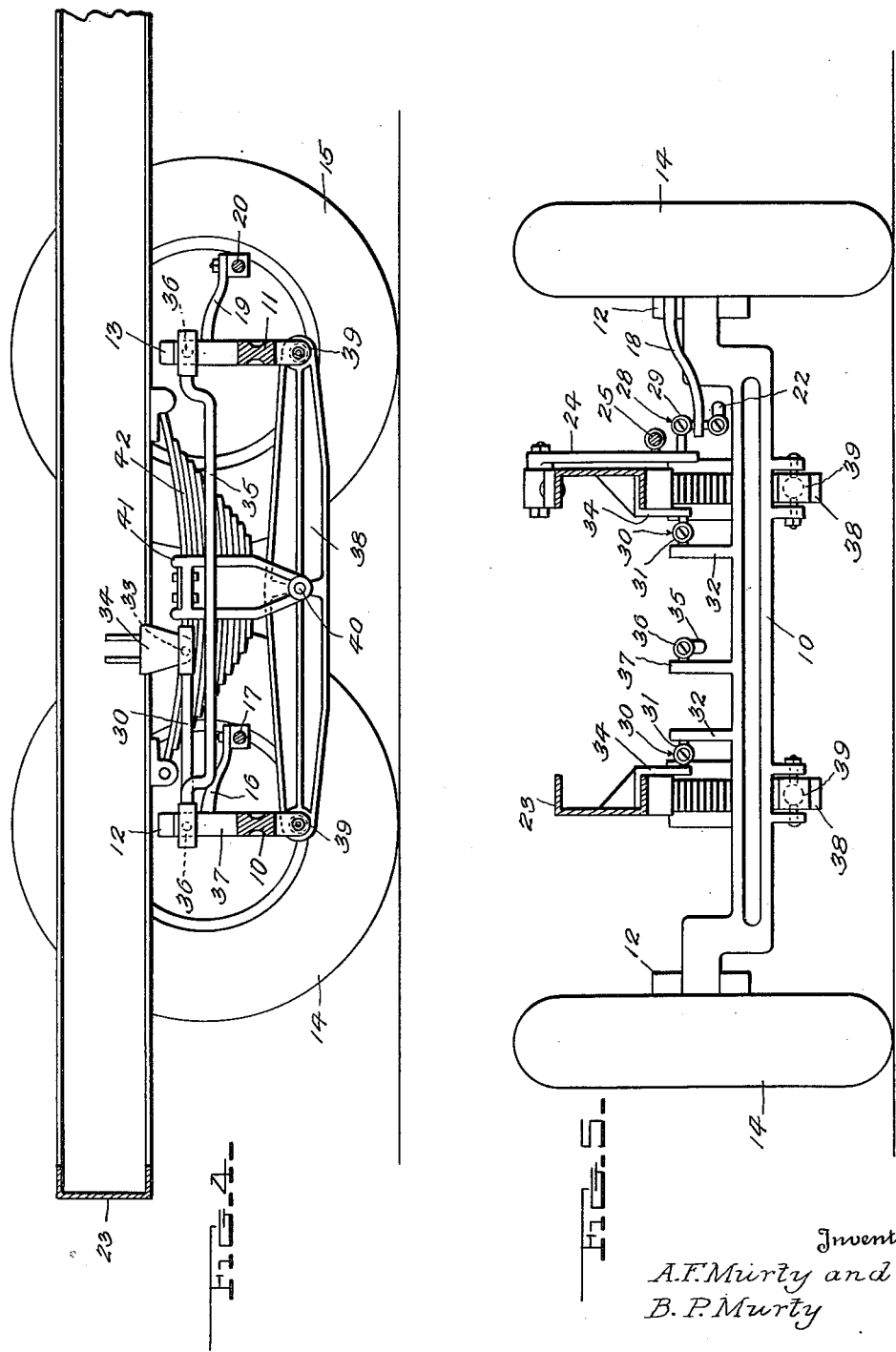

Patented July 6, 1943

2,323,669

UNITED STATES PATENT OFFICE 2,323,669

TANDEM FRONT-END AXLE AND STEERING ASSEMBLY

Anthony F. Murty and Benedict P. Murty, Portland, Oreg.

Application December 31, 1941, Serial No. 425,226

7 Claims. (Cl. 280—91)

The constantly increasing demands upon the automotive industry for equipment capable of hauling heavier loads, have caused serious consideration of the practicability of using tandem front axles, to not only carry greater weight but to permit more uniform load distribution, to give added protection against side slip and skidding in general, to afford additional braking surfaces, and if the front wheels be driven, to provide increased traction. As a great deal of heavy-load equipment must often be driven over unimproved secondary roads, over equally bad private roads leading to factories, mills, logging camps and the like, and frequently over very rough unprepared ground, the necessity of a practicable arrangement to permit all necessary relative vertical movements of the front wheels without overloading some and unloading others, has become an important factor. The necessity of such relative vertical movements of the front wheels, severely complicates the problem of steering, for the steering mechanism must be such that it will have no tendency to turn the wheels from their true paths and will produce no severe shocks upon the steering wheel or other parts whenever either axle vertically moves bodily with respect to the frame, and whenever either end of either axle moves vertically with respect to the other end.

The present invention has been devised to fulfill all requirements and make possible the construction of truly practicable heavy-load equipment having tandem front axles, whether these axles be power axles or dead axles.

With the foregoing in view, the invention resides in the novel subject matter hereinafter described and claimed, the description being accomplished by reference to the accompanying drawings.

Figure 1 is a perspective view with parts omitted.

Figure 2 is a top plan view.

Figures 3 and 4 are longitudinal sectional views on lines 3—3 and 4—4 of Fig. 2.

Figure 5 is a transverse section on line 5—5 of Figs. 2 and 3.

Figure 6 is a diagrammatic perspective illustrating the arrangement which is employed when four front axles are used instead of two.

Figure 7 is a disassembled perspective view illustrating one of the steering arms and portions of the drag-link and steering-arm-tie-rod associated therewith.

Figure 8 is a perspective view of the frame-carried arm employed when only two front axles are used.

Figure 9 is a perspective view showing the corresponding arm which is used when four or more axles are employed.

A preferred construction and arrangement has been disclosed, with the understanding, however, that within the scope of the invention as claimed, variations may be made.

We disclose two tandem front axles 10 and 11 each having wheel-supported knuckles at its ends, the knuckles of the front axle 10 being shown at 12 and those of the rear axle 11, at 13.

Axle-carried steering elements are provided, said steering elements connecting the four knuckles 12 and 13 to effect simultaneous steering of the front and rear sets of wheels 14 and 15, the parts being so proportioned that the wheels will be "cut" or turned to the proper extent regardless of how much the machine is to be steered in one direction or the other. In the present disclosure, the front knuckles 12 are provided with arms 16 connected by a transverse tie-rod 17, and one of said knuckles 12 is equipped with a steering arm 18. Similarly, the rear knuckles 13 are provided with arms 19 connected by a transverse tie-rod 20, and one of these knuckles 13 is equipped with a steering arm 21 directly behind the front steering arm 18, these two steering arms 18 and 21 being connected by a longitudinal steering-arm-tie-rod 22, which tie-rod may be offset in any direction as required in order to clear other parts.

Other steering elements are provided on the vehicle frame 23. In the present disclosure, these elements include a forwardly and rearwardly swingable pendulum arm 24 connected by a drag-link 25 with the usual forwardly and rearwardly swingable steering arm 26 of a steering unit 27 having the usual steering wheel W (Fig. 3). On very heavy equipment, power steering mechanism could, of course, be employed.

The pendulum arm 24 is located between the axles 10 and 11 and for cab-over-engine trucks, the drag-link 25 will extend forwardly as shown. For other equipment, with the cab further to the rear, the drag-link 25 may extend rearwardly or the arm 24 may be directly connected with the cross shaft of a steering unit such as 27.

A drag-link 28 extends between the steering arm 18 and the pendulum arm 24 and is pivotally connected with both of these arms by ball-joints 29, said drag-link 28 being about horizontal under average load, in the preferred construction.

At least one longitudinal torque-rod 30 connects the axle 10 with the frame 23 and is coextensive with the drag-link 28. There are preferably two of these torque-rods 30 as seen for instance in Figs. 2 and 5. The front end of each torque-rod 30 is connected by a ball joint 31 with a perch 32 on the axle 10, and the rear end of each rod 30 is connected by a ball-joint 33 with a bracket 34 on the frame 23. The front pivot 31 of each torque-rod 30 is horizontally alined lengthwise of the axle 10, with the front pivot 29 of the drag-link 28, and the rear pivot 33 of each torque-rod 30 is horizontally alined in the same direction, with the rear pivot of said drag-link 28. Another longitudinal rod 35 ties the two axles 10 and 11 together and constitutes a torque-rod for the axle 11, the ends of this axle-tie-and-torque-rod 35 being connected by ball-joints 36 with perches 37 on the axles.

While, in the present disclosure, the drag-link 28 and the torque-rods 30 extend forwardly to the front axle 10, it is of course possible to have them extend rearwardly to the other axle 11, if desired, in which case, the drag-link 28 would connect with the rear steering arm 21 instead of the arm 18.

Two longitudinal walking-beams 38 extend between the axles 10 and 11 and are connected with these axles by ball-joints or the like 39. The walking-beams 38 are centrally pivoted at 40 to saddles 41 supporting appropriate springs 42, these springs being connected in a conventional way with the frame 23. The ball-joints 39 are preferably under the axles 10 and 11 and the major portions of these axles are preferably dropped below the ends of said axles for lower center of gravity. Then too, by mounting the frame on the axles as herein disclosed, it is not essential that the front end of said frame have any upward bows or offsets, simplifying frame construction. When viewed as in Figs. 3 and 4, the walking-beams 38 and the axle-tie-and-torque-rod 35 form two sides of a parallelogram, the ends of this parallelogram being formed by the perches 37, the axles 10 and 11, and the axle-carried portions of the ball-joints 39, which is important in holding the axles in properly spaced relation and permitting all required relative movements thereof, whether either axle moves bodily with respect to the frame, or either end of either axle moves upwardly or downwardly with respect to said frame. Unless both axles rise together, or move downwardly together, the vertical movement of the frame 23 will never be as great as the vertical axle movement, due to the manner of supporting the frame with the aid of the walking-beams 38. For example, assume that the front axle 10 should drop into a gulley, the walking-beams 38 would swing downwardly a corresponding distance, about their rear ends as pivots, but the saddles 41 would only move down half as much, with the result that the frame would only move downwardly half as far as the front axle.

During any vertical movements of the axles with respect to the frame, whether such movements be simultaneous or independent, no forward or rearward shifting of the front drag-link pivot 29 out of alinement with the torque-rod pivot or pivots 31 will be caused and furthermore the rear pivots of said drag-link and torque-rod or rods will remain in alinement, assuming of course that the wheels are in straight-ahead position. Thus, vertical axle movements will have no tendency to swing the steering arms 18 and 21 either forwardly or rearwardly, with the result that any vertical wheel movements will have no tendency to "cut" the wheels in one direction or the other and will produce no severe steering wheel shocks or shocks on other parts of the steering mechanism.

From the foregoing taken in connection with the accompanying drawings, it will be seen that the invention will well fulfill all requirements. In addition, it minimizes danger of serious accidents from either a tire failure or a broken axle. In case of a blow-out on one front tire, there is still another tire on the same side to aid in guiding the machine while bringing it to a standstill. In case of a broken front axle, one or both of the walking beams 38 will simply swing down and slide along the road or ground while the machine is being stopped.

Should it be desired to have four front axles, an assemblage 43 of elements substantially duplicating the assemblage above described, may be employed behind said above described assemblage. Then, the second arm 24' behind the arm 24, would be connected with this arm by a longitudinal tie-rod or link 25'. Even two more axles and associated elements could be connected behind the assemblage 43, if desired.

Attention is again invited to the possibility of making variations within the scope of the invention as claimed.

We claim:

1. In a land vehicle, two tandem front axles each provided with two wheel-supported knuckles; a load-carrying frame; steering elements carried by said axles and operatively connecting the four knuckles thereof, said axle-carried elements including a front steering arm on one knuckle of the front axle, a rear steering arm on the corresponding knuckle of the rear axle, and a longitudinal steering-arm-tie-rod connecting said front and rear steering arms; additional steering elements carried by said frame and including a forwardly and rearwardly movable member between said axles; a longitudinal drag-link pivoted to said forwardly and rearwardly movable member and to one of said axle-carried elements to effect steering; means yieldably supporting said frame on said axles and including longitudinal walking-beams extending between and pivoted to said axles; a longitudinal torque-rod pivoted to said frame and to one of said axles and substantially co-extensive with said drag-link; and a longitudinal axle-tie-and-torque-rod connecting and pivoted to the two axles; said torque-rod, said drag-link, said walking-beams, said axle-tie-and-torque-rod, and said steering-arm-tie-rod being all cooperable to prevent any swinging of said steering arms with respect to said axles when either of said axles rises or descends bodily with respect to said frame and when either end of either axle rises or descends with respect to said frame, except for steering purposes.

2. In a land vehicle, two tandem front axles each provided with two wheel-supported knuckles; a load-carrying frame; steering elements carried by said axles and operatively connecting the four knuckles of said axles, said axle-carried elements including a front steering arm on one knuckle of the front axle, a rear steering arm on the corresponding knuckle of the rear axle, and a longitudinal steering-arm-tie-rod connecting said front and rear steering arms; additional steering elements carried by said frame and including a forwardly and rearwardly movable member between said axles; a longitudinal drag-link pivoted to said forwardly and rearwardly movable member and to one of said axle-carried elements to effect steering; means yieldably supporting said frame on said axles and including longitudinal walking beams extending between and pivoted to said axles; a longitudinal torque-rod pivoted to said frame and to one of said axles, the front pivots of said torque-rod and drag-link being alined lengthwise of said one of said axles, and the rear pivots of said torque-rod and drag-link being likewise alined lengthwise of said one of said axles; and a longitudinal axle-tie-and-torque-rod connecting and pivoted to the two axles; said torque-rod, said drag-link, said walking-beams, said axle-tie-and-torque-rod and said steering-arm-tie-rod being all cooperable to prevent any swinging of said steering arms with respect to said axles when either of said axles rises or descends bodily with respect to said frame and when either end of either axle rises or descends with respect to said frame, except for steering purposes.

3. In a land vehicle, two tandem front axles each provided with two wheel-supported knuckles; a load-carrying frame; steering elements carried by said axles and operatively connecting the four knuckles of said axles, said axle-carried elements including a steering arm on one knuckle of the front axle, a steering arm on the corresponding knuckle of the rear axle, and a longitudinal steering-arm-tie-rod connecting said front and rear steering arms; additional steering elements carried by said frame and including a forwardly and rearwardly movable member between said axles; a longitudinal drag-link pivoted to said forwardly and rearwardly movable member and to said steering arm of one of said axles to effect steering, means yieldably supporting said frame on said axles and including longitudinal walking-beams extending between and pivoted to said axles; a longitudinal torque-rod pivoted to said frame and to said one of said axles, the front pivots of said torque-rod and drag-link being alined lengthwise of said one of said axles, and the rear pivots of said torque-rod and drag-link being likewise alined lengthwise of said one of said axles; and a longitudinal axle-tie-and-torque-rod extending between and pivoted to the two axles; said torque-rod, said drag-link, said walking-beams, said axle-tie-and-torque-rod, and said steering-arm-tie-rod being all cooperable to prevent any swinging of said steering arms with respect to said axles when either of said axles rises or descends bodily with respect to said frame and when either end of either axle rises or descends with respect to said frame, except for steering purposes.

4. In a land vehicle, a load-carrying frame, two tandem front axles provided with dirigible wheels, a torque-rod connecting one of said axles with said frame, means yieldably supporting said frame on said axles and including a walking-beam extending between and pivoted to said axles, and an axle-tie-and-torque rod extending between and pivoted to said axles, said walking-beam and said axle-tie-and-torque-rod forming two sides of a parallelogram, the ends of which include said axles.

5. In a land vehicle, a load-supporting frame, a front axle provided with two wheel-supported knuckles, steering elements carried by said axle and operatively connecting the knuckles thereof, said axle-carried elements including a steering arm on one of said knuckles, additional steering elements carried by said frame and including a forwardly and rearwardly movable member, a longitudinal drag-link disposed in a substantially horizontal plane and pivoted to said forwardly and rearwardly movable member and to one of said axle-carried elements to effect steering, and a longitudinal torque-rod disposed in the aforesaid plane and pivoted to said frame and to said axle, the front pivots of said torque-rod and drag-link being alined in a direction parallel with the length of said axle, and the rear pivots of said torque-rod and drag-link being likewise alined in a direction parallel with the length of said axle; said torque-rod and drag-link being cooperable to prevent any swinging of said steering arm with respect to said axle when the latter either rises or descends with respect to said frame, except for steering purposes.

6. In a land vehicle, a load-supporting frame, a front axle provided with two wheel-supported knuckles, steering elements carried by said axle and operatively connecting the knuckles thereof, said axle-carried elements including a steering arm on one of said knuckles, additional steering elements carried by said frame and including a forwardly and rearwardly movable member, a longitudinal drag-link disposed in a substantially horizontal plane and pivoted to said forwardly and rearwardly movable member and to said steering arm to effect steering, and a longitudinal torque-rod disposed in the aforesaid plane and pivoted to said frame and to said axle, the front pivots of said drag-link and torque-rod being alined in a direction parallel with the length of the axle, and the rear pivots of said drag-link and torque-rod being likewise alined in a direction parallel with the length of said axle; said torque-rod and drag-link being cooperable to prevent any swinging of said steering arm with respect to said axle when the latter either rises or descends with respect to said frame, except for steering purposes.

7. A structure as specified in claim 1; together with a duplicate assembly of axles, knuckles, steering arms, steering-arm-tie-rod, drag-link, torque-rod, axle-tie-and-torque rod, and frame-supporting means behind the assemblage defined in said claim 1; an additional forwardly and rearwardly movable member mounted on said frame and connected with the drag-link of said rear assembly, and an additional tie-rod connecting the two forwardly and rearwardly movable members with each other.

ANTHONY F. MURTY.
BENEDICT P. MURTY.